(12) United States Patent
Ravindranath et al.

(10) Patent No.: US 9,646,302 B2
(45) Date of Patent: May 9, 2017

(54) SYSTEMS, METHODS, AND COMPUTER PROGRAM PRODUCTS FOR MANAGING WALLET ACTIVATION

(71) Applicant: GOOGLE INC., Mountain View, CA (US)

(72) Inventors: Sajith Ravindranath, Stamford, CT (US); Balamourougan Ranganathan, Cummings, GA (US)

(73) Assignee: GOOGLE INC., Mountain View, CA (US)

( * ) Notice: Subject to any disclaimer, the term of this patent is extended or adjusted under 35 U.S.C. 154(b) by 611 days.

(21) Appl. No.: 14/164,901

(22) Filed: Jan. 27, 2014

(65) Prior Publication Data
US 2014/0297524 A1 Oct. 2, 2014

Related U.S. Application Data

(60) Provisional application No. 61/805,424, filed on Mar. 26, 2013.

(51) Int. Cl.
*G06F 15/16* (2006.01)
*G06Q 20/36* (2012.01)
*G06Q 20/32* (2012.01)

(52) U.S. Cl.
CPC ........... *G06Q 20/36* (2013.01); *G06Q 20/322* (2013.01)

(58) Field of Classification Search
USPC ................................. 235/379; 709/203, 206
See application file for complete search history.

(56) References Cited

U.S. PATENT DOCUMENTS

| 5,590,038 A | 12/1996 | Pitroda ........................ 395/241 |
| 5,640,002 A | 6/1997 | Ruppert et al. ............... 235/472 |
| 5,748,740 A | 5/1998 | Curry et al. .................... 380/25 |
| 5,805,702 A | 9/1998 | Curry et al. .................... 380/24 |
| 5,884,271 A | 3/1999 | Pitroda ............................ 705/1 |
| 5,901,303 A | 5/1999 | Chew .......................... 395/400 |
| 5,940,510 A | 8/1999 | Curry et al. .................... 380/25 |
| 5,949,880 A | 9/1999 | Curry et al. .................... 380/24 |

(Continued)

FOREIGN PATENT DOCUMENTS

| CA | 2 381 614 A1 | 3/2001 |
| EP | 1 222 503 A2 | 7/2002 |

(Continued)

OTHER PUBLICATIONS

Baharlou, "International Preliminary Report on Patentability issued in International Application No. PCT/US2014/013168", mailed on Oct. 8, 2015, 7 pages.

(Continued)

*Primary Examiner* — Daniel Hess
(74) *Attorney, Agent, or Firm* — Johnson, Marcou & Isaacs, LLC

(57) ABSTRACT

Systems, methods, and computer program products are provided for managing activation in a mobile wallet. A wallet activation request is received from a wallet client. The wallet activation request is transmitted to a central trusted service manager (TSM). One or more push messages including activation data are received from the TSM, and the push messages are transmitted to the wallet client, in response to a second request from the wallet client while the wallet client is in an active state.

18 Claims, 8 Drawing Sheets

(56) References Cited

U.S. PATENT DOCUMENTS

| | | | | |
|---|---|---|---|---|
| 6,073,840 | A | 6/2000 | Marion | 235/381 |
| 6,105,013 | A | 8/2000 | Curry et al. | 705/65 |
| 6,116,505 | A | 9/2000 | Withrow | 235/381 |
| 6,131,811 | A | 10/2000 | Gangi | 235/380 |
| 6,237,095 | B1 | 5/2001 | Curry et al. | 713/178 |
| 6,422,464 | B1 | 7/2002 | Terranova | 235/384 |
| 6,587,835 | B1 | 7/2003 | Treyz et al. | 705/14 |
| 6,601,759 | B2 | 8/2003 | Fife et al. | 235/375 |
| 6,671,358 | B1 | 12/2003 | Seidman et al. | 379/93.12 |
| 6,732,081 | B2 | 5/2004 | Nicholson | 705/14 |
| 6,769,607 | B1 | 8/2004 | Pitroda et al. | 235/380 |
| 6,813,609 | B2 | 11/2004 | Wilson | 705/14 |
| 6,837,436 | B2 | 1/2005 | Swartz et al. | 235/472.02 |
| 6,925,439 | B1 | 8/2005 | Pitroda | 705/1 |
| 7,083,094 | B2 | 8/2006 | Cooper | 235/449 |
| 7,110,792 | B2 | 9/2006 | Rosenberg | 455/558 |
| 7,127,236 | B2 | 10/2006 | Khan et al. | 455/414.1 |
| 7,155,405 | B2 | 12/2006 | Petrovich | 705/26 |
| 7,194,422 | B1 | 3/2007 | Killick | 705/14 |
| 7,216,109 | B1 | 5/2007 | Donner | 705/64 |
| 7,249,112 | B2 | 7/2007 | Berardi et al. | 705/79 |
| 7,286,818 | B2 | 10/2007 | Rosenberg | 455/414.1 |
| 7,298,271 | B2 | 11/2007 | Sprogis | 340/572.1 |
| 7,308,426 | B1 | 12/2007 | Pitroda | 705/35 |
| 7,330,714 | B2 | 2/2008 | Rosenberg | 455/412.1 |
| 7,349,885 | B2 | 3/2008 | Gangi | 705/41 |
| 7,469,151 | B2 | 12/2008 | Khan et al. | 455/558 |
| 7,469,381 | B2 | 12/2008 | Ording | 715/702 |
| 7,483,858 | B2 | 1/2009 | Foran et al. | 705/39 |
| 7,494,055 | B2 | 2/2009 | Fernandes et al. | 235/380 |
| 7,529,563 | B1 | 5/2009 | Pitroda | 455/558 |
| 7,571,139 | B1 | 8/2009 | Giordano et al. | 705/40 |
| 7,581,678 | B2 | 9/2009 | Narendra et al. | 235/451 |
| 7,613,628 | B2 | 11/2009 | Ariff et al. | 705/14 |
| 7,631,810 | B2 | 12/2009 | Liu et al. | 235/451 |
| 7,693,752 | B2 | 4/2010 | Jaramillo | 705/26 |
| 7,708,198 | B2 | 5/2010 | Gangi | 235/380 |
| 7,712,658 | B2 | 5/2010 | Gangi | 235/380 |
| 7,775,430 | B2 | 8/2010 | Lin | 235/383 |
| 7,805,615 | B2 | 9/2010 | Narendra et al. | 713/186 |
| 7,828,214 | B2 | 11/2010 | Narendra et al. | 235/451 |
| 7,856,377 | B2 | 12/2010 | Cohagan et al. | 705/14.3 |
| 7,864,163 | B2 | 1/2011 | Ording et al. | 345/173 |
| 7,942,337 | B2 | 5/2011 | Jain | 235/492 |
| 7,954,715 | B2 | 6/2011 | Narendra et al. | 235/451 |
| 7,954,716 | B2 | 6/2011 | Narendra et al. | 235/451 |
| 7,954,717 | B2 | 6/2011 | Narendra et al. | 235/451 |
| 7,961,101 | B2 | 6/2011 | Narendra et al. | 340/572.1 |
| 7,967,215 | B2 | 6/2011 | Kumar et al. | 235/492 |
| 7,991,158 | B2 | 8/2011 | Narendra et al. | 380/260 |
| 8,072,331 | B2 | 12/2011 | Narendra et al. | 340/572.1 |
| 8,083,145 | B2 | 12/2011 | Narendra et al. | 235/451 |
| 8,091,786 | B2 | 1/2012 | Narendra et al. | 235/451 |
| 8,131,645 | B2 | 3/2012 | Lin et al. | 705/51 |
| 8,140,418 | B1 | 3/2012 | Casey et al. | 705/35 |
| 8,341,088 | B2 | 12/2012 | Boutahar et al. | 705/76 |
| 8,396,808 | B2 | 3/2013 | Greenspan | 705/64 |
| 8,429,046 | B2 | 4/2013 | Pitroda | 705/35 |
| 8,875,228 | B2 | 10/2014 | Gargiulo et al. | 726/1 |
| 2002/0049631 | A1 | 4/2002 | Williams | 705/14 |
| 2002/0082921 | A1 | 6/2002 | Rankin | 705/14 |
| 2002/0174025 | A1 | 11/2002 | Hind et al. | 705/26 |
| 2002/0179703 | A1 | 12/2002 | Allen | 235/381 |
| 2003/0009382 | A1 | 1/2003 | D'Arbeloff et al. | 705/17 |
| 2003/0083042 | A1 | 5/2003 | Abuhamdeh | 455/406 |
| 2003/0115126 | A1 | 6/2003 | Pitroda | 705/36 |
| 2003/0132298 | A1 | 7/2003 | Swartz et al. | 235/472.02 |
| 2003/0200489 | A1 | 10/2003 | Hars | 714/703 |
| 2004/0073519 | A1 | 4/2004 | Fast | 705/65 |
| 2004/0186768 | A1 | 9/2004 | Wakim et al. | 705/14 |
| 2005/0004866 | A1 | 1/2005 | Bonalle et al. | 705/39 |
| 2005/0171898 | A1 | 8/2005 | Bishop et al. | 705/39 |
| 2005/0222961 | A1 | 10/2005 | Staib et al. | 705/64 |
| 2005/0234769 | A1 | 10/2005 | Jain et al. | 705/14 |
| 2005/0247777 | A1 | 11/2005 | Pitroda | 235/380 |
| 2006/0287004 | A1 | 12/2006 | Fuqua | 455/558 |
| 2007/0014407 | A1 | 1/2007 | Narendra et al. | 380/259 |
| 2007/0014408 | A1 | 1/2007 | Narendra et al. | 380/270 |
| 2007/0198432 | A1 | 8/2007 | Pitroda et al. | 705/64 |
| 2008/0306849 | A1 | 12/2008 | Johnson, Jr. et al. | 705/35 |
| 2009/0108064 | A1 | 4/2009 | Fernandes et al. | 235/380 |
| 2009/0164322 | A1 | 6/2009 | Khan et al. | 705/14 |
| 2010/0088188 | A1 | 4/2010 | Kumar et al. | 705/17 |
| 2010/0241494 | A1 | 9/2010 | Kumar et al. | 705/14.1 |
| 2011/0073663 | A1 | 3/2011 | Narendra et al. | 235/492 |
| 2011/0171996 | A1 | 7/2011 | Narendra et al. | 455/558 |
| 2011/0223972 | A1 | 9/2011 | Narendra et al. | 455/558 |
| 2011/0231238 | A1 | 9/2011 | Khan et al. | 705/14.26 |
| 2011/0244796 | A1 | 10/2011 | Khan et al. | 455/41.1 |
| 2011/0269438 | A1 | 11/2011 | Narendra et al. | 455/414.1 |
| 2011/0271044 | A1 | 11/2011 | Narendra et al. | 711/103 |
| 2011/0272468 | A1 | 11/2011 | Narendra et al. | 235/492 |
| 2011/0272469 | A1 | 11/2011 | Narendra et al. | 235/492 |
| 2012/0064828 | A1 | 3/2012 | Khan et al. | 455/41.1 |
| 2012/0109764 | A1 | 5/2012 | Martin et al. | 705/17 |
| 2012/0323664 | A1 | 12/2012 | Klems | 705/14.26 |
| 2013/0262302 | A1 | 10/2013 | Lettow et al. | 705/41 |
| 2013/0317924 | A1 | 11/2013 | Bush et al. | 705/16 |
| 2013/0317927 | A1 | 11/2013 | Bush et al. | 705/21 |
| 2014/0058937 | A1 | 2/2014 | Watson | 705/41 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| EP | 2 498 180 A1 | 9/2012 |
| WO | WO 01/18629 A3 | 3/2001 |
| WO | WO 03/012717 A1 | 2/2003 |
| WO | WO 2005/079254 A2 | 9/2005 |
| WO | WO 2006/010800 A1 | 2/2006 |
| WO | WO/2012/091349 * | 7/2012 |
| WO | WO 2012/091349 A2 | 7/2012 |
| WO | 2014/158331 A1 | 10/2014 |

OTHER PUBLICATIONS

Int'l Search Report and Written Opinion issued in connection with Int'l Appl'n. No. PCT/US2014/013168 on May 14, 2014 (9 pages).

* cited by examiner

SYSTEMS, METHODS, AND COMPUTER PROGRAM PRODUCTS FOR MANAGING WALLET ACTIVATION

CROSS REFERENCE TO RELATED APPLICATION

This application claims priority to U.S. Provisional Application No. 61/805,424, filed Mar. 26, 2013, the contents of which are incorporated herein by reference.

BACKGROUND OF THE INVENTION

Field

The present invention generally relates to mobile wallets in mobile devices for use in mobile commerce, and more particularly to systems, methods, and computer program products for managing wallet activation.

Related Art

In a mobile commerce environment, service provider transactions, accounts, products and the like often are stored and processed in a mobile wallet application on a client (e.g., customer) mobile device. A service provider (SP) is a company, organization, entity, or the like, that provides services to customers or consumers. Examples of service providers include account-issuing entities such as banks, merchants, card associations, marketing companies, and transit authorities. A service may be an activity, capability, functionality, work, or use permitted or provided by a service provider, such as a payment service, credit, debit, checking, gift, offer or loyalty service, transit pass service, and the like.

Because many provider transactions, accounts, products and the like are stored and processed in a mobile wallet, there is a need to ensure that the mobile wallet is installed successfully on the mobile device.

Activation of a mobile wallet on a client mobile device may be based on a "push" mechanism. A "push" mechanism transmits activation data to the wallet at a timing determined by the service provider (i.e., the service provider "pushes" data to the mobile device). In contrast, in a "pull" mechanism, the client mobile device requests and receives data at a timing determined by the mobile device or a user thereof (i.e., the mobile device "pulls" data from the service provider).

At the same time, some mobile device operating systems are enabled in a manner which allows multitasking, for example through the use of foreground and background applications. In such cases, the mobile device user may optionally push applications to the background, i.e., to a non-active or less-active state. The terms "non-active", "less active" and/or "inactive" and the plural versions thereof are used interchangeably herein to refer to an application that is not in a fully active state.

When an application is no longer in an active state, such as when it has been pushed to the background, certain aspects may be interrupted. With particular regard to wallet activation, if the wallet application is pushed to the background during the activation process, there is a significant risk that the process is fatally interrupted and fails entirely. Moreover, when an activation process is relatively long compared to other tasks running on the mobile device, the risk of interruption increases, as the user may not be ready or willing to leave the application in the foreground for long periods of time.

BRIEF DESCRIPTION

The present invention provides systems, methods, and computer program products for managing wallet activation in a mobile wallet.

In one embodiment, a wallet activation request is received from a wallet client. The wallet activation request is transmitted to a central trusted service manager (TSM). One or more push messages including activation data are received from the TSM, and the push messages are transmitted to the wallet client, in response to a second request from the wallet client while the wallet client is in an active state.

In another embodiment, a wallet client transmits a wallet activation request to a wallet server. The wallet server transmits the activation request to a central trusted service manager (TSM), and the wallet server receives one or more push messages including activation data from the TSM. The wallet client transmits a second request to the wallet server while the wallet client system is in an active state, and receives the one or more push messages while in an active state.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

I. System

The example embodiments of the invention presented herein are directed to systems, methods, and computer program products for activating a mobile wallet and transferring data thereto, which are now described herein in terms of an example system in a mobile commerce environment. This is for convenience only and is not intended to limit the application of the present invention. In fact, after reading the following description, it will be apparent to one skilled in the relevant art(s) how to implement the following invention in alternative environments such as mobile marketing, advertising, ticketing, information services, browsing, and the like.

Figure 1:
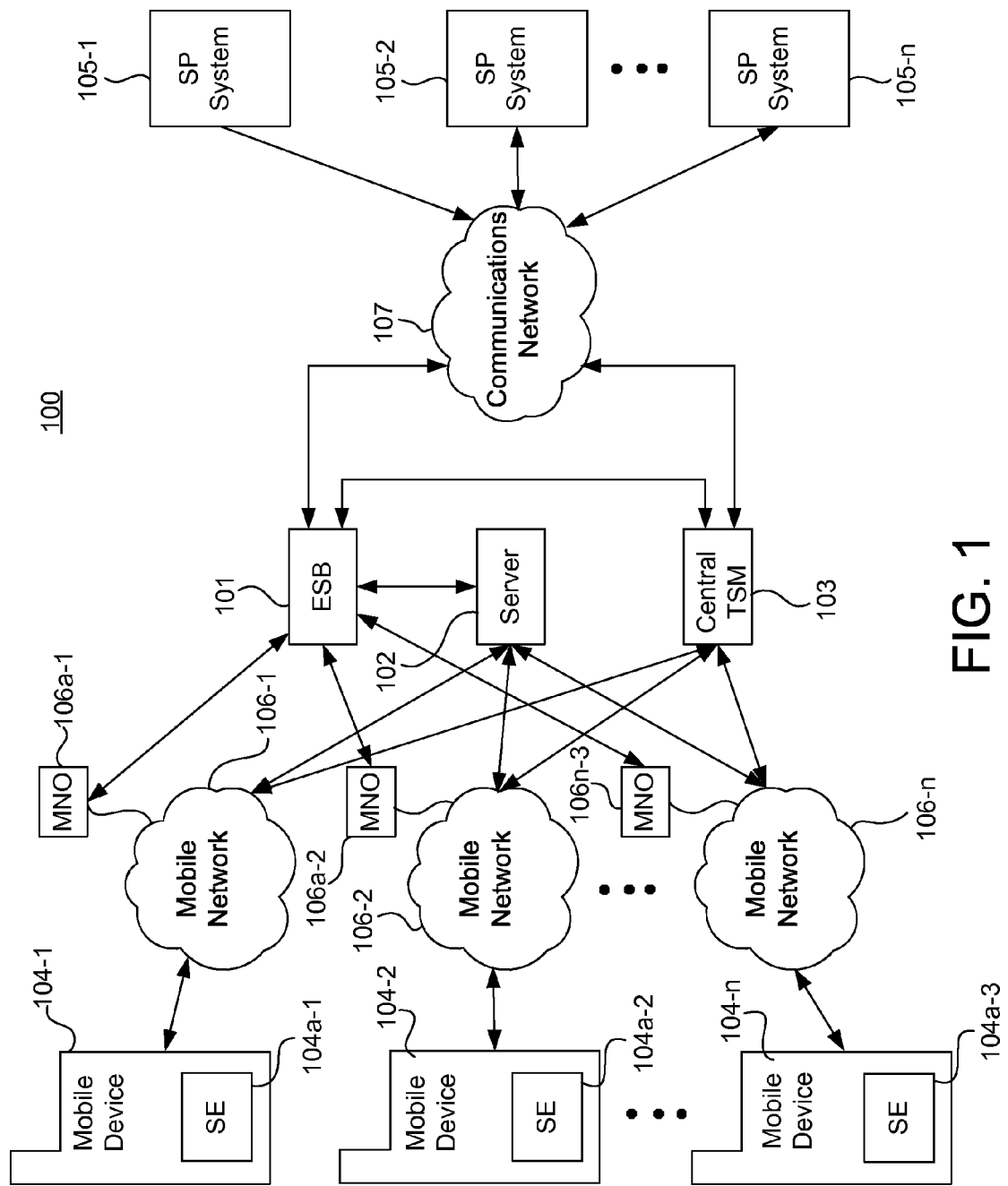
FIG. 1 is a diagram of a system for activating a mobile wallet and transmitting payload data according to an exemplary embodiment.

FIG. 1 is a diagram of an exemplary system 100 for activating a mobile wallet and transferring data.

As shown in FIG. 1, system 100 includes an enterprise service bus (ESB) 101, which is communicatively coupled to a server 102 (which may also be referred to as a "wallet server" or "mobile wallet server") and a central trusted service manager (TSM) 103.

ESB 101 manages interactions between service provider systems and mobile devices, and grants the service provider systems the ability to efficiently and securely communicate with the mobile devices in order to, for example, set up a service account or transmit a message, without the need for directly communicating with each mobile device. In an example embodiment, the ESB 101 is hardware and/or software that is implemented to serve as an intermediary between SP systems 105, wallet server 102, TSM 103 and mobile devices 104, for example, for provisioning service accounts in mobile wallets and managing events.

Particularly, the ESB 101 is a system that manages communications between mutually interacting systems and/or entities. In an exemplary embodiment, the ESB 101 is operable to perform duties such as: managing and controlling requests and messages, handling and choreographing events, queuing and organizing events, etc. Interacting systems and/or entities may be publishers that transmit data to the ESB 101. In turn, the ESB 101 publishes the data to subscriber systems, such as systems corresponding to (or controlled and/or managed by) entities such as mobile network operators (MNOs), trusted service managers (TSMs), mobile wallets, mobile wallets issuers, and/or service providers.

The wallet server 102 and the central TSM 103 are each communicatively coupled to mobile devices 104-1, 104-2, . . . , 104-n (collectively "104") via corresponding mobile networks 106-1, 106-2, . . . , 106-n (collectively "106").

TSM 103 is typically an independent entity serving MNOs and account-issuing service providers by provisioning applications, such as contactless applications associated with the service providers, to mobile devices. Typical TSMs can distribute and manage the contactless applications remotely because they have access to secure elements (SEs) in a near field communication (NFC) enabled mobile device. Each of the mobile networks 106 is operated by a corresponding MNO 106a-1, 106a-2, . . . , 106a-n (collectively "106a").

The wallet server 102 and the central TSM 103 communicate with mobile devices 104 via the mobile networks 106, using security protocols such as Global Platform secure channel protocol, SSL, TLS, or the like. Mobile networks 106 may be mobile device cellular networks, radio networks, or the like.

The ESB 101 is communicatively coupled to service provider (SP) systems 105-1, 105-2, . . . , 105-n (collectively "105") via a communications network 107. A service provider system (i.e., service provider) transmits a request to an ESB to set up a service account in a mobile wallet. The request may be self-prompted by the service provider or may be sent in response to a prompt from the mobile wallet. It may also include service account information, which is to be used to set up the service account on the mobile wallet. Service account information includes, for example, a service account reference number, service provider identifier (ID), service product type, wallet instance ID, target mobile device number (MDN), etc. Communications network 107 may be a virtual private network (VPN), a network using Hypertext Transfer Protocol (HTTP) standards, or the like.

Each of the mobile devices 104 includes a corresponding secure element 104a-1, 104a-2, . . . , 104a-n (collectively "104a"), and a corresponding mobile wallet 104b-1, 104b-2, . . . , 104b-n (collectively "104b"). Each of the mobile devices 104 may include a user interface such as a display.

A wallet client application ("wallet client") is stored in a non-transitory memory of a mobile device, and includes instructions which, when executed by the processor of a mobile device, interface the mobile wallet with other devices on the system, and provide necessary data to the user, to cause the mobile device to act as an instrument, for example, for processing contactless transactions or for processing commerce information such as offer or loyalty information. A mobile wallet and a corresponding secure element may communicate using ISO 7816 commands, in order to conduct contactless transactions. In the example embodiments described herein, the wallet client may be executed in an operating system (OS) allowing multitasking via foreground and background states. In that regard, the terms "mobile wallet", and/or "wallet client" and the plural versions thereof are used interchangeably herein to a mobile wallet application on a mobile device.

In example embodiments herein, the invention may be located at one or more of wallet server 102, mobile device(s) 104, and central TSM 103, although other locations are possible.

II. Process

Figure 2:
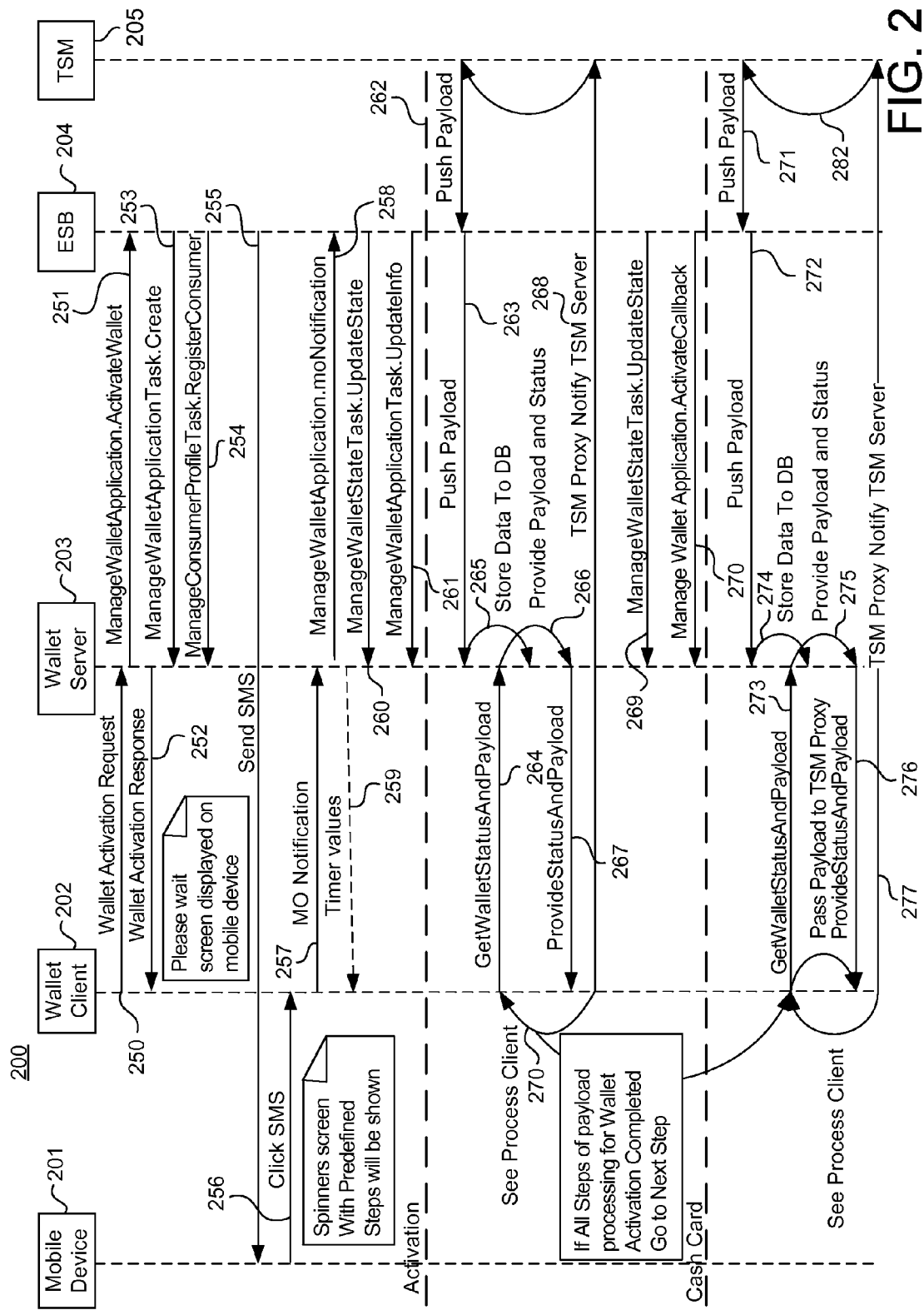
FIG. 2 is a sequence diagram illustrating a sequence for activating a mobile wallet according to an exemplary embodiment.

FIG. 2 depicts a sequence diagram 200 for activating a mobile wallet on a mobile device according to an exemplary embodiment.

Briefly, in FIG. 2, a wallet activation request is received from a wallet client. The wallet activation request is transmitted to a central trusted service manager (TSM). One or more push messages including activation data are received from the TSM, and the push messages are transmitted to the wallet client in response to a second request from the wallet client while the wallet client is in an active state (e.g., currently executing on the mobile device and receiving events). For example, the second request from the wallet client is received when the wallet client is in a foreground state (e.g., currently displayed on the mobile device and accessible by a user).

In more detail, as shown in FIG. 2, in step 250, a wallet client 202 executing on mobile device 201 (e.g., FIG. 1, mobile device 104-1) transmits a wallet activation request to a wallet server 203 (e.g., FIG. 1, server 102). In step 251, a ManageWalletApplication.ActivateWallet command is sent from wallet server 203 to ESB 204 (e.g., FIG. 1, ESB 101) to activate the mobile wallet via wallet client 202. In one embodiment, the wallet server establishes a wallet activation session with the central TSM 205 (via ESB 204) for receiving the push messages.

Figure 7:
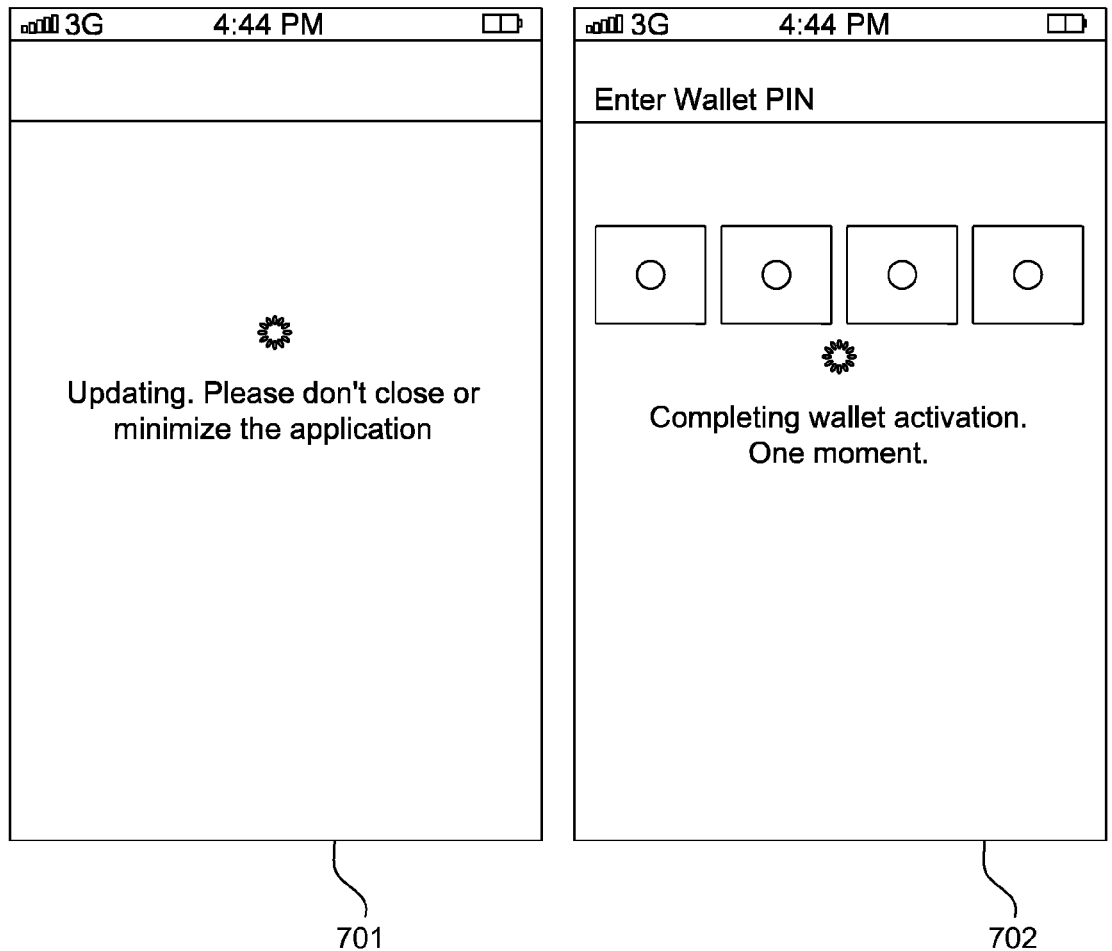
FIG. 7 is a view illustrating an example display during wallet activation according to an exemplary embodiment.

In step 252, wallet server 203 transmits a Wallet Activation Response to wallet client 202, confirming, for example, that the wallet activation request has been received and that an activation process has been initiated. At this time, a "Please Wait" screen, for example as shown in FIG. 7, view 701, may be displayed on the mobile device to inform the user that corresponding tasks are being performed at wallet server 203.

For example, in step 253, in response to the ManageWalletApplication.ActivateWallet command, ESB 204 issues a ManageWalletApplicationTask.Create command to wallet server 203, and in step 254, ESB 204 issues a ManageConsumerProfileTask.RegisterConsumer to wallet server 203. These commands cause wallet server 203 to create an entry in wallet server 203 for wallet client 202, i.e., to create a record corresponding to the wallet client 202 on the wallet server 203, and to manage a consumer profile corresponding to wallet client 202, respectively.

In step 255, a short message service (SMS) message (e.g., a text message) is sent from ESB 204 to mobile device 201. The message may prompt for a click or other selection of an option in the message to confirm readiness for initiating the activation process. In one embodiment, a user response to the message sent as step 255 may be required before performing the activation process.

In step 256, a click (or other selection) is entered into the mobile device 201, for example on a displayed portion of the SMS message, to confirm readiness for activation. In response, in step 257, wallet client 202 sends a mobile operator (MO) notification to wallet server 203, and in step 258 wallet server 203 transmits a ManageWalletApplication.moNotification command to ESB 204 to confirm readiness of mobile device 201 for the activation process. Thus, the mobile device can control a timing of activation at its desired time or at the convenience of the user of the mobile device.

In step 259, based on characteristics such as estimated data amount and transfer time, wallet server 203 may also transmit timer values (with or without associated descriptions of steps being performed) to wallet client 202. Based on these values, wallet client 202 may display a screen that shows a progress indicator indicating progress of activation (such as the spinning wheel shown in FIG. 7), along with other instructions or notifications to prevent or discourage cancellation of the process, and/or pushing the activation application to the background. In that regard, wallet client 202 may enable reception of push messages for a predetermined period of time (e.g., only polling for 30 minutes to reduce the possibility that the user is kept waiting for an undesirable period of time or to conserve battery). Thus, while messages are pushed to the wallet server, the wallet client still controls the timing of activation by enabling reception of the messages from the wallet server.

In one example, a progress notification may be displayed on the mobile device. In addition, step 259 may be ongoing throughout the activation process, so as to continuously inform a user of the progress of activation or other associated tasks.

In step 260, ESB 204 transmits ManageWalletStateTask.UpdateState to wallet server to inform the wallet server on the state of the activation process (which may then be sent with timer values in step 259 to update the client). In step 261, ESB 204 transmits ManageWalletApplicationTask.UpdateInfo to wallet server 203, to update information on the wallet client 202, including its activation.

In step 262, TSM 205 (e.g., FIG. 1, Central TSM 103) pushes a payload of bundled activation messages to ESB 204, and in step 263, ESB 204 pushes the payload to wallet server 203. A "payload" is the cargo of a data transmission. In the context of the description herein, "payload" also refers to a "bundled payload", which includes multiple data cargo (i.e. multiple data elements) which might otherwise be transmitted separately. Thus, a bundled payload might include multiple activation messages, multiple elements for setup service account information, and the like. Accordingly, one or more push messages are generated at the TSM 205, and include one or more bundled payloads with each bundled payload having multiple data elements. In one example, the payload contains the MDN, a session id, a URL to connect back to, and a timer value indicating how long they payload is valid. The URL may indicate where to connect to direct TSM 205 to pick what kind of action is requested by the client or scheduled for the client to interact to. Of course, various other different combinations of data could also be included in a payload. The payload may also be partially or entirely encrypted so that the contents may be known only to TSM 205 and mobile device 201.

Wallet server 203 stores the payload on a database (DB) in step 265. In this regard, according to the embodiment, the wallet server 203 collects and stores each payload pushed from TSM 205, until the payload is "pulled" by the wallet client 202 while the wallet client 202 is in an active state and/or when the user is ready. In that regard, the general process of client control of data transmission via request is generally referred to as a "pull" mechanism, but the specific issuing of requests from client to server (or other sender) is referred to as "polling", as described below.

In one embodiment, the wallet server 203 is always "on" and connected to the network (as opposed to the wallet client 202), so payloads are not lost. However, the wallet server 203 may periodically delete push messages which have not been processed by the wallet client 202. In addition, the wallet server 203 may store the payloads in a payload table.

In step 264, in an ongoing polling process, wallet client 202 issues a request for a payload (GetWalletStatusAndPayload) to wallet server 203 to obtain the payload. In some examples, wallet client 202 may display a notification on the mobile device informing the user whether a payload is ready for delivery and waiting. In that regard, the polling process may be retried a number of times until payload delivery is successful. In one embodiment, polling is only performed when the wallet client 202 is in an active state on mobile device 201. Details of the process performed at the wallet client 202 during the activation process are described more fully below with respect to FIG. 5.

Having received the request from the client for the payload and processed the request in step 266, in step 267, the wallet server 203 sends the payload and/or status of the activation to wallet client 202 via a ProvideStatusAndPayload message. Having received the payload, in step 268, a TSM proxy application at wallet client 202 notifies TSM 205 of successful delivery of the payload.

In step 269, ESB 204 transmits a ManageWalletStateTask.UpdateState command to wallet server 203 to update the state of the wallet activation in response to indication of successful delivery of the payload.

In step 270, ESB 204 transmits a ManageWalletApplication.ActivateCallback command to wallet server 203 to confirm activation of the wallet client on mobile device 201.

Then, with the activation payload having been successfully processed, a second push/polling process is performed in order to, for example, push a second bundled payload of setup service account and key rotation information to the wallet client. Thus, in one example, a first push message includes a first bundled payload comprising wallet activation data, and a second push message includes a second bundled payload comprising setup service account information and key rotation information.

Setup service account information may include, for example, a call initiator parameter for the entity or system initiating a request, a service account parameter including information that may be used to determine the account-based service product offered by a service provider to a consumer, a service account reference number to identify a service account, a service product type parameter identifying a type of service product, an operational mode identifier for identifying a mode of a service account, among other parameters, as described in more detail in U.S. patent application Ser. No. 13/848,962, entitled "Systems, Methods, and Computer Program Products For Provisioning Payment Accounts Into Mobile Wallets And Managing Events," which is incorporated herein by reference in its entirety.

In step 271, a second push process is prepared to send a second payload of setup service account information and key rotation information to wallet client 202.

In that regard, steps 271, 272, 273, 274, 275, 276 and 277 generally correspond to the steps of the push/pull process described above in steps 262 to 268 with respect to the first payload, but for a second payload of, e.g., setup service account and key rotation information. For purposes of conciseness, therefore, the details of the general push/pull process are not repeated here.

Thus, according to the above example embodiment, it is ordinarily possible to better manage wallet activation so that, for example, messages are not received out of sequence or while the wallet application is in a background state.

Figure 3:
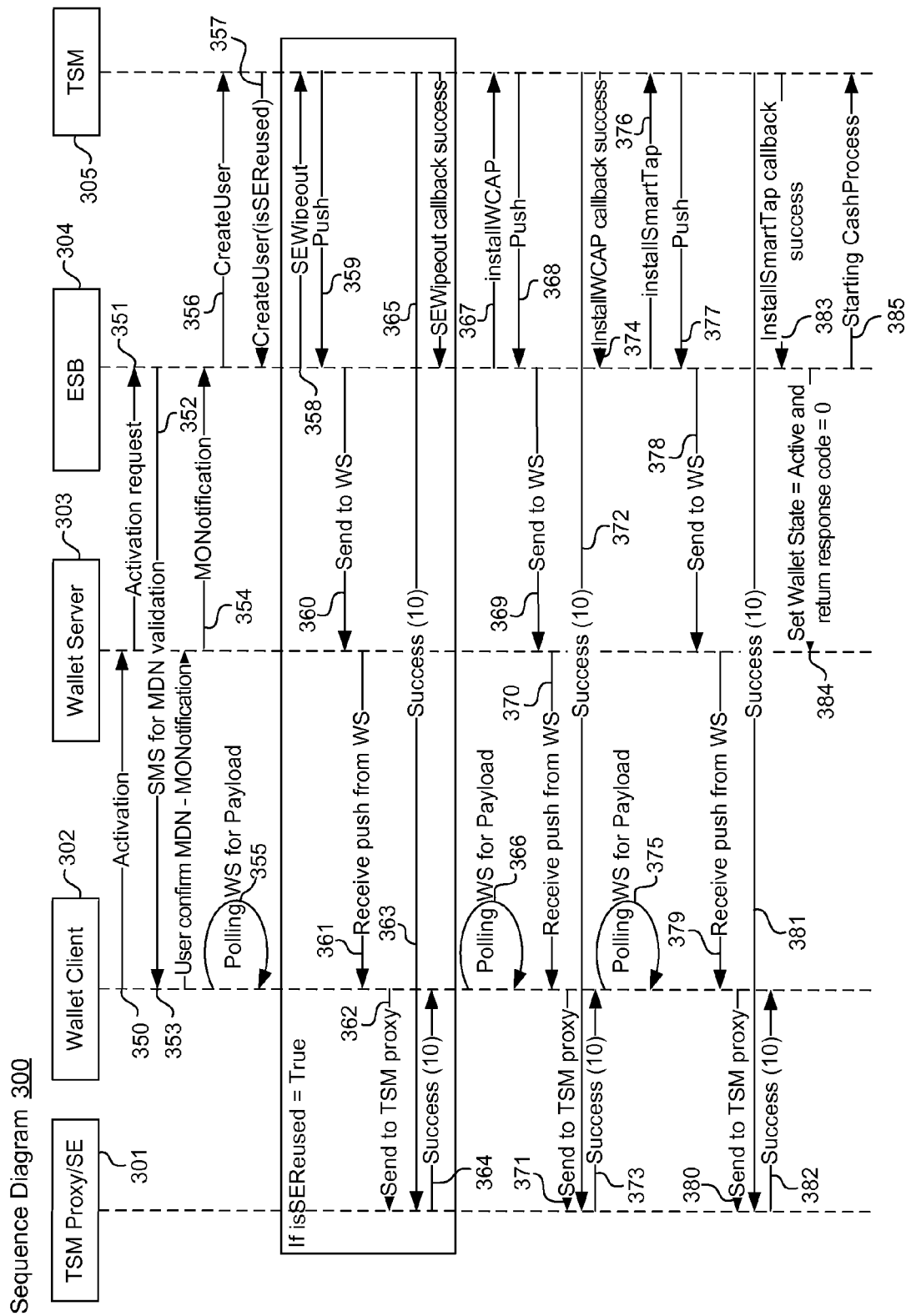
FIG. 3 is a sequence diagram illustrating a sequence for provisioning credentials to a mobile wallet according to an exemplary embodiment.

FIG. 3 illustrates an activation flow diagram 300 from the perspective of a TSM proxy application 301 stored on a secure element (e.g., FIG. 1, SE 104a-1). The TSM proxy application 301 may be an application on the user's mobile device (e.g., FIG. 1, mobile device 104-1, FIG. 2, mobile device 201) which acts as a proxy for the TSM on the mobile device, and which manages TSM communications from the mobile device.

As shown in FIG. 3, in step 350, wallet client 302 transmits an activation message to wallet server 303 (e.g., FIG. 1, server 102). In response, in step 351, wallet server 303 transmits an activation request to ESB 304 (e.g., FIG. 1, ESB 101). In step 352, ESB 304 sends an SMS message to wallet client 302, requesting to validate a mobile device number (MDN) of the mobile device. This SMS message may incorporate, or correspond to, the SMS message transmitted in step 255 described above.

In step 353, the user confirms the MDN by, e.g., typing in or otherwise selecting information on the mobile device to validate the identity of the mobile device, and wallet client 302 transmits the MONotification (described above with respect to step 257) to wallet server 303. Wallet server 303, in turn, transmits the MONotifcation to ESB 304 step 354.

In step 355, wallet client 302 polls for a push message. As mentioned above, while messages are pushed to a wallet server, a wallet client controls the timing of activation by enabling reception of the messages from the wallet server.

In response to receiving the MONotification, ESB 304 transmits a CreateUser command to TSM 305 in step 356, in order to create a user account for the mobile device user. In step 357, TSM 305 transmits a CreateUser(isSEReused) command to ESB 304, which inquires whether the secure element on the mobile device can be reused to store payload information.

If isSeReused=True (i.e., the secure element is a secure element which has old data on it or otherwise is to be reused), then ESB 304 transmits an SEWipeout command to TSM 305 in step 358, indicating that the secure element can be reused, and to wipe out (e.g., erase or overwrite) information on the secure element with new user information for the activation. Accordingly, in step 359, a payload of activation data is pushed to ESB 304, from ESB 304 to wallet server 303 in step 360, and from wallet server 303 to wallet client 302 in step 361. Wallet client 302 sends the pushed data to the TSM proxy 301 in step 362.

In step 363, TSM 305 queries TSM proxy 301 regarding the result (e.g., success, failure) in processing the received data on the secure element and performing a wipeout (e.g., deleting data) of the secure element. Assuming that the function is a success, in step 364 TSM proxy 301 responds with a success message to wallet client 302. Then, in step 365, TSM 305 notifies ESB 304 of the secure element wipeout and writing success with a callback message.

Thus, to briefly summarize steps 358 to 365, wallet client 302 polls for a push message, ESB 304 requests a function, and a data payload is pushed from TSM 305 to ESB 304 to wallet server 303 to wallet client 302 to TSM proxy 301. TSM 305 queries TSM proxy 301 for a result (e.g., success), and TSM proxy 301 responds by informing wallet client 302 of success. TSM 305 then informs ESB 304 of the success. As shown in the remainder of FIG. 3, this general transmission sequence is repeated for the processes referred to as "installWCAP" and "InstallSmartTap", and for purposes of conciseness, description of the transmission sequence is not repeated.

Thus, in steps 366, 367, 368, 369, 370, 371, 372, 373 and 374, the functions performed (and corresponding information requested and pushed) correspond to a process referred to as "installWCAP", which installs a wallet companion applet (WCAP) on the secure element of the mobile device, and is described in more detail in, for example, U.S. application Ser. No. 13/857,400, entitled "Systems, Methods, and Computer Program Products For Securing And Managing Applications On Secure Elements," which is incorporated herein by reference in its entirety. Generally, a WCAP is an applet on a secure element that is used, for example, to perform security functions such as secure storage of data, performing authentications and parity checks, authenticating servers, etc.

In steps 375, 376, 377, 378, 379, 380, 381, 382 and 383, the functions performed (and corresponding information requested and pushed) correspond to a process referred to as "InstallSmartTap", which installs a "SmartTap" application to manage customer offers and loyalty data, and is described in more detail in, for example, U.S. application Ser. Nos. 13/901,134 and 13/901,188, both entitled "Systems, Methods, And Computer Program Products For Providing A Contactless Protocol," each of which is incorporated herein by reference in its entirety. Generally, SmartTap is an applet on a secure element to manage and facilitate contactless transactions.

Following that, in step 384, ESB 304 instructs wallet server 303 to set its stored state of the wallet client as "active", and to return a response code of "0". Then, in step 385, ESB 304 instructs TSM 305 to start a CashProcess for provisioning cash or other credit to the wallet client. An example CashProcess is described below with respect to FIG. 4.

Figure 4:
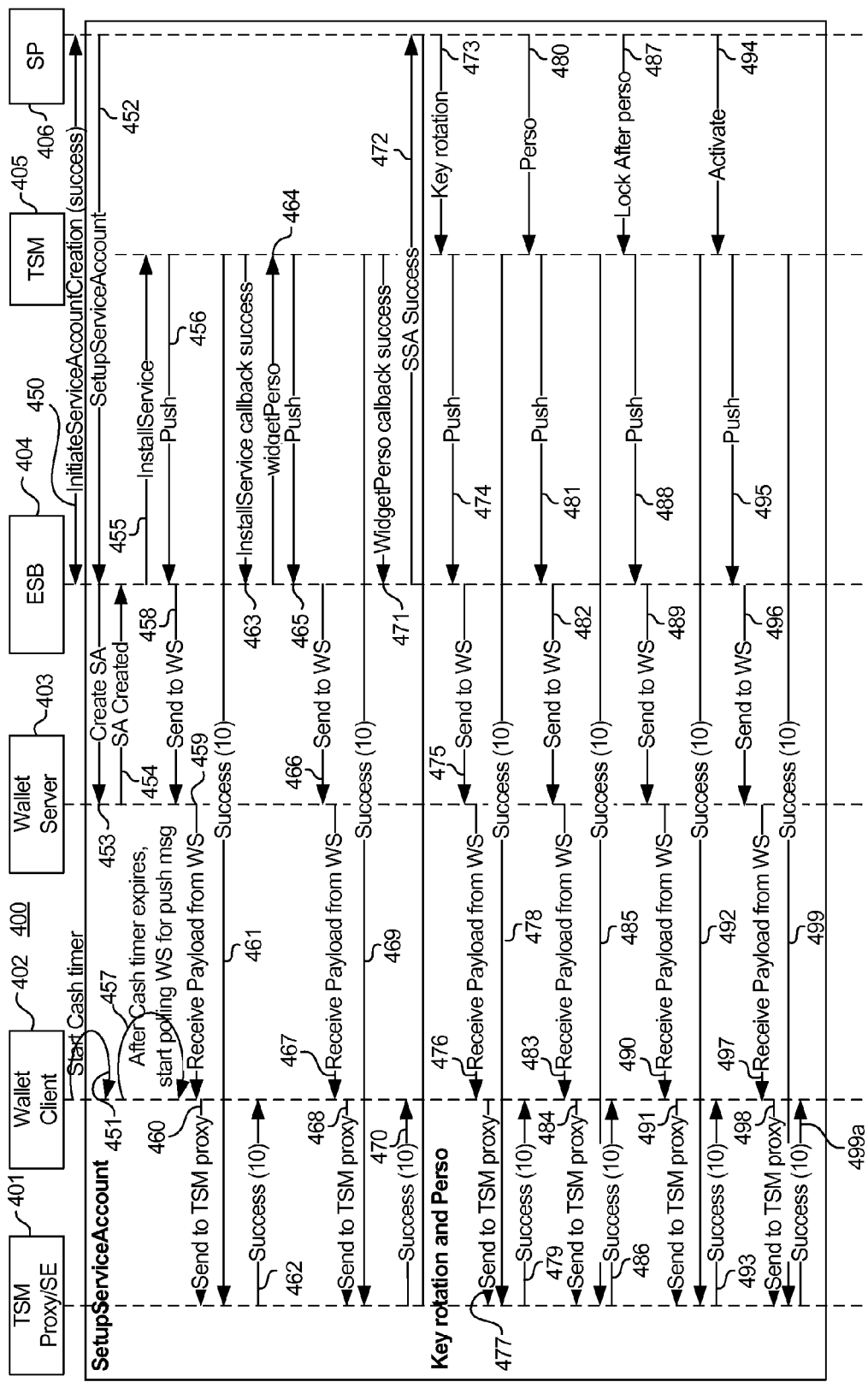
FIG. 4 is a sequence diagram illustrating another sequence for provisioning credentials to a mobile wallet according to an exemplary embodiment.

FIG. 4 is a sequence diagram for explaining an example process 400 for provisioning cash or other credit to a wallet client. In particular, FIG. 4 illustrates a cash provision flow diagram from the perspective of a TSM proxy application 401 stored on a secure element (e.g., FIG. 1, SE 104a-1). The TSM proxy application 301 may be an application on a mobile device (e.g., FIG. 1, mobile device 104-1, FIG. 2, mobile device 201) which acts as a proxy for the TSM on the mobile device. In that regard, FIG. 4 corresponds to at least two processes—a process referred to as "Setup Service Account", described below with respect to steps 450 to 472, and a process referred to as "Key Rotation and Perso", described below with respect to steps 473 to 499a.

In step 450, ESB 404 sends a request to service provider 406 to initiate a service account creation, and service provider 406 may acknowledge the request with a success response. In step 451, a cash timer is started at wallet client 402. The timer counts for a predetermined period of time to allow setup processes to occur elsewhere. In step 452, service provider 406 instructs ESB 404 to set up a service account ("SetupServiceAccount"), and ESB 404 responds in step 453 by instructing wallet server 403 to create a service account ("Create SA"). Wallet server 403 creates a service account, and in step 454, wallet server 403 informs ESB 404 that it has created the service account. In step 455, ESB 404 requests TSM 405 to push service install information ("InstallService").

Meanwhile, in step 457, after the cash timer started in step 451 has expired, wallet client 402 begins polling for a message from wallet server 403, e.g., requests service account setup information.

In step 456, TSM 405 pushes the service install information to ESB 404. In step 458, the information is sent to wallet server 403, which pushes the information to the wallet client 402 in step 459. In step 460, wallet client 402 sends the information to the TSM proxy 401. In step 461, TSM 405 queries TSM proxy 301 of success, and in step 462 TSM proxy 401 responds by informing wallet client 402 of success.

Having completed the install service account creation, in step 463 TSM 405 confirms to ESB 404 that Installservice was a success. In response, in step 464, ESB 403 queries TSM 405 for the next set of information pertaining to a widget corresponding to the user of the account, referred to as "widgetPerso". In step 465, the information is pushed to ESB 404. In step 466, the information is sent to wallet server 403, and in step 467, wallet client 402 receives the push message containing the information from wallet server 403. The information is pushed to TSM proxy 401 in step 468. In step 469, TSM 405 queries TSM proxy 401 as to success, and in step 470 TSM proxy 401 responds by informing wallet client 402 of success.

Having completed the transmission of information pertaining to "WidgetPerso", in step 471, TSM 405 confirms to ESB 404 that Installservice was a success. ESB 404 responds in step 472 by confirming success to service provider 406.

Accordingly, the setup of the service account for storing provisioned cash should be complete, and information can be pushed from the service provider 406 to the TSM proxy 401.

A data transmission process, referred to "Key Rotation and Perso", will now be described with respect to steps 473 to 499a. Generally, the process corresponds to pushing payloads of information from service provider 406, which ultimately are received at TSM proxy 401.

For example, in step 473, key rotation information is pushed from service provider 406 to TSM 405. In step 474, TSM 405 pushes the key rotation information to ESB 404. In step 475, ESB 404 sends the information to wallet server 403. In step 476, wallet client 402 receives pushed information from wallet server 403, and transfers it to TSM proxy 401 in step 477. In step 478, TSM 405 queries TSM proxy 401 of success, and TSM proxy 401 responds in step 479 by informing wallet client 402 of success.

Thus, to briefly summarize steps 473 to 479, service provider 406 pushes information to TSM 405, the information is pushed from TSM 405 to ESB 404 to wallet server 403 to wallet client 402 to TSM proxy 401. TSM 405 queries TSM proxy 401 as to success, and TSM proxy 401 responds by informing wallet client 402 as to success. As shown in the remainder of FIG. 4, this general process is repeated for the processes referred to as "Perso", "Lock After perso" and "Activate", and for purposes of conciseness, detailed description of the general transmission process is not repeated.

Thus, in steps 480, 481, 482, 483, 484, 485 and 486, the functions performed (and corresponding information requested and pushed) correspond to a process referred to as "Perso", which personalizes an applet on a secure element by adding or installing data (e.g. credentials) to that applet, and is described in more detail in, for example, U.S. application Ser. No. 13/653,145, entitled "Systems, Methods, and Computer Program Products For Managing Secure Elements," which is incorporated herein by reference in its entirety.

In steps 487, 488, 489, 490, 491, 492 and 493, the functions performed (and corresponding information requested and pushed) correspond to a process referred to as "Lock After perso", which locks an applet on a secure element after that applet has been personalized, and is described in more detail in, for example, U.S. application Ser. No. 13,653,145 mentioned above.

In steps 494, 495, 496, 497, 498, 499 and 499a, the functions performed (and corresponding information requested and pushed) correspond to a process referred to as "Activate" which activates an applet on a secure element, and is described in more detail in, for example, U.S. application Ser. No. 13/653,145 mentioned above.

Figure 5:
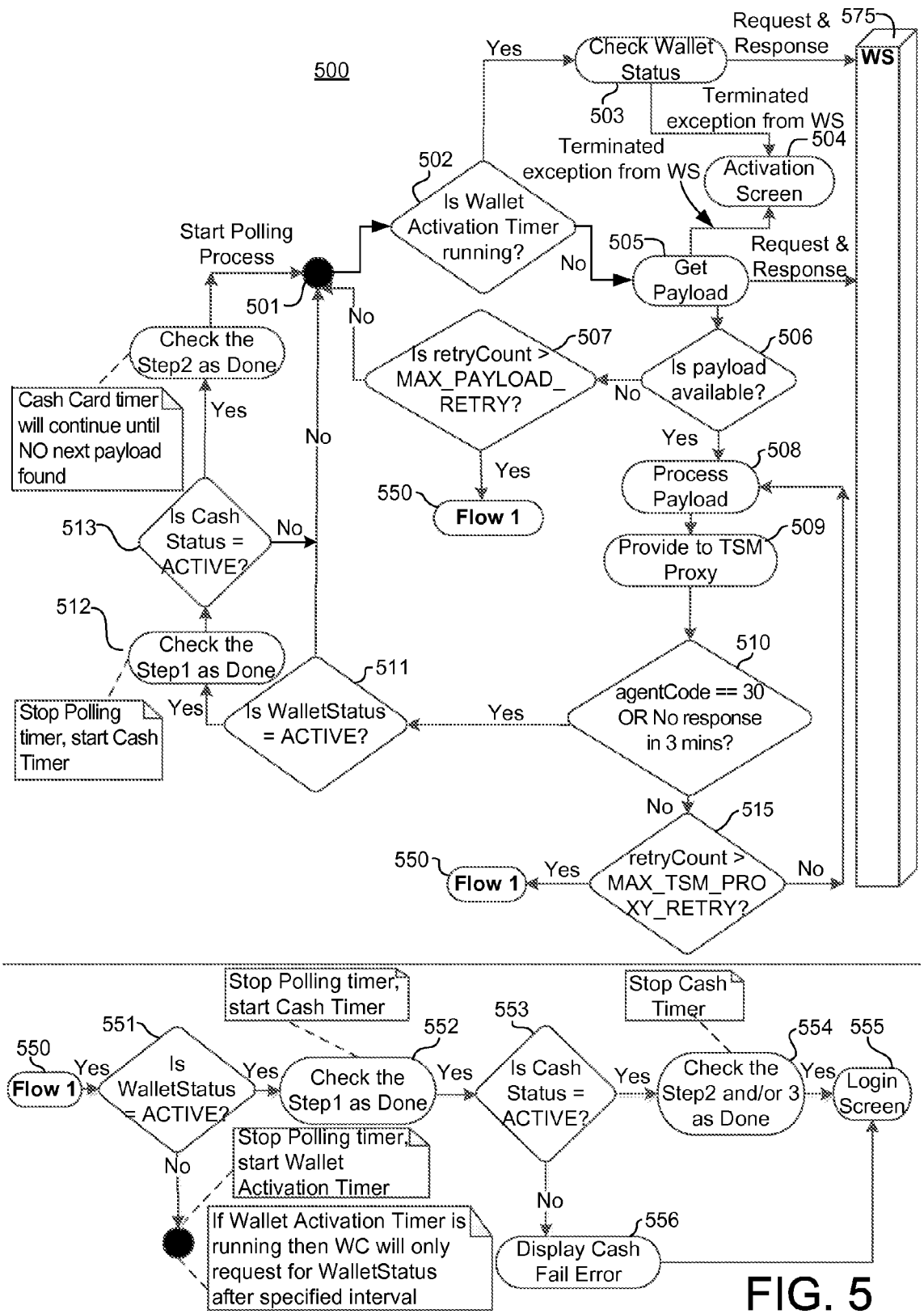
FIG. 5 is a flow diagram illustrating a client process for activating a mobile wallet according to an exemplary embodiment.

FIG. 5 is a flow diagram 500 illustrating a wallet client process for activating a mobile wallet according to an exemplary embodiment.

In particular, FIG. 5 depicts a process by a wallet client executing on a client device (e.g., FIG. 1, mobile device 104-1) which interacts with a wallet server 575 (e.g., FIG. 1, server 102).

In step 501, the wallet client begins a polling process to pull information from the wallet server. In step 502, the wallet client determines whether the wallet activation timer is running. In that regard, as described above with respect to FIG. 2, the wallet activation timer stores a predetermined period of time for the wallet client to wait while background processes are completed. For example, the wallet activation timer might run to a maximum of, e.g., 30 minutes. If the final payload is received before that, the process is complete, whereas if there is a delay or a message is lost, the wallet client waits up to the 30 minutes to terminate the flow with the TSM. Generally, however, the activation process should require a shorter period of time than the maximum allotted by the timer. For example, an activation process might only require 5 to 8 minutes.

If the wallet activation timer is running, the process proceeds to step 503, where the wallet client checks the wallet status by request and response from wallet server 575. If the wallet client receives a terminated exception from wallet server 575, the process proceeds to step 504. In step 504, the wallet client displays an activation screen such as screen 701 in FIG. 7, which provides information to the mobile device (and optionally the user via the display of the mobile device) that the application is updating and requests that the application not be closed or minimized, or screen 702, which displays an instruction to wait while background processes are completing or updating.

Returning to step 502, if the wallet activation timer is not running (e.g., it has expired), then the wallet client proceeds to step 505, to get a payload from wallet server 575 via a request and response. As above, if the wallet client receives a terminated exception from wallet server 575, the process again proceeds to step 504, where the wallet client displays an activation screen such as screen 701 or screen 702 in FIG. 7.

If no terminated exception is received, the process proceeds to step 506, where there is a determination of whether a payload is available. If the payload is not available, the process proceeds to step 507, where the wallet client determines whether the number of retries for getting the payload has exceeded a limit (e.g., is count of retries "retryCount">limit "MAX_PAYLOAD_RETRY"). If the number of retries for getting the payload has exceeded the limit, the process proceeds to "Flow 1" at step 550, which will be discussed more fully below. On the other hand, if the number of retries for getting the payload has not exceeded the limit, the process returns to step 501 to begin the polling process again.

Returning to step 506, if the payload is available, the wallet client processes the payload in step 508, and transmits the payload to the TSM proxy in step 509. In step 510, the wallet client waits for a response from the TSM proxy. If "agentCode==30" (a positive response) or there has not been a response from the TSM proxy in a predetermined amount of time (e.g., 3 minutes), it is assumed that the payload has been received and processed by the TSM proxy successfully, and the process proceeds to step 511.

In step 511, the wallet client determines whether the wallet status is "ACTIVE". If so, and no further payloads are necessary for activation, the wallet client checks "step 1" (e.g., wallet activation) as done in step 512, and stops the polling timer for activation while starting a new timer for cash provision. In that regard, the cash provisioning timer can have the same general functionality as discussed above with respect to step 502. In step 513, the wallet client determines whether the cash status is also "ACTIVE". If not, the process returns to step 501 to begin the polling process. If the cash status is "ACTIVE", in step 514 the wallet client checks step 2 (cash provision) as done, although the cash card timer continues until no payload is found. The process then returns to step 501 to poll for additional payloads (e.g., further cash provisioning).

Returning to step 510, if "agentCode" does not receive a positive response or there has been a (negative) response from the TSM proxy within the 3 minute window, the process proceeds to step 515, where the wallet client checks a number of retries for the TSM proxy to successfully process the payload (retryCount) against an upper limit on the number of retries (MAXTSM_PROXY_RETRY). If the limit has been exceeded, the process proceeds to "Flow 1" in step 550. Otherwise, the process returns to step 508 to attempt again to process the payload.

Turning now to "Flow 1", in step 551 the wallet client determines whether the wallet status is "ACTIVE". If not, the polling timer is stopped, and the wallet activation timer is started. If the wallet activation timer is already running, then the wallet client waits for a specified interval and requests for the wallet status. On the other hand, if the wallet status is "ACTIVE", the wallet client checks "step 1" (e.g., wallet activation) as done in step 552, and determines whether the cash status is "ACTIVE" in step 553. If cash status is not active, a cash fail error is displayed at step 556, and the wallet client proceeds to step 555 to display a login screen. On the other hand, if the cash status is active, the wallet client checks step 2 (cash provision) as done and stops the cash timer in step 554, and proceeds to step 555 to display the login screen.

Figure 6:
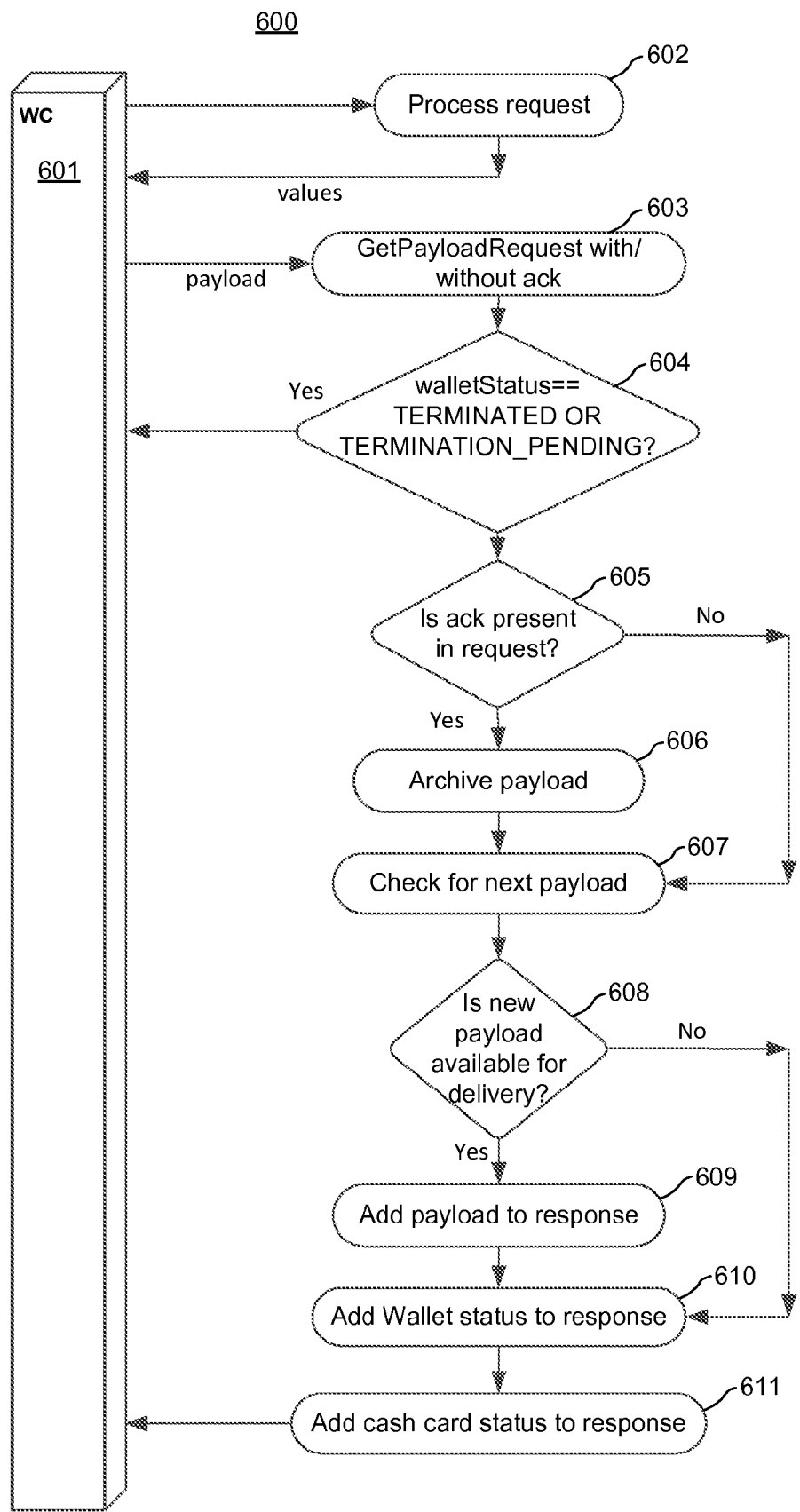
FIG. 6 is a flow diagram illustrating a server process for activating a mobile wallet according to an exemplary embodiment.

FIG. 6 is a flow diagram illustrating a process 600 for activating a mobile wallet according to an exemplary embodiment, from the perspective of a wallet server interacting with a wallet client 601.

In step 602, the wallet server receives a mobile operator (MO) notification request from wallet client 601, and processes the request to return a MO notification response and timer values (e.g., expected wait times for the wallet client to process payloads).

In step 603, the wallet server receives a request for a payload from wallet client 601, and issues a GetPayloadRequest, which can be issued with or without requiring acknowledgment, to obtain a payload from the ESB (e.g., ESB 101 in FIG. 1).

In step 604, the wallet server determines whether the status of the wallet client is "TERMINATED" or "TERMINATION_PENDING". If either case is true, the wallet client is not active and/or authorized, and the wallet client throws an exception to wallet client 601.

Otherwise, the process proceeds to step 605, where the wallet server determines whether an acknowledgment has been received in response to the request for payload sent in step 603. If so, data about the payload is archived for record keeping in step 606, and the process proceeds to step 607 to check for a next payload from the ESB. If an acknowledgment was not present in the request, the wallet server simply proceeds to step 607 to check for the next payload.

In step 608, the wallet server determines whether the new payload is available for delivery to wallet client 601. If not, the process proceeds to step 610 to add the current wallet status to the response to wallet client 601 (e.g., to inform the wallet client that the payload is not yet available for delivery). If the payload is available, in step 609 the payload is added to the response to be sent to the wallet client 601, and the (available) status of the payload is added to the response in step 610.

In step 611, a cash card status is added to the response to the wallet client 601, and the response is sent to wallet client 601.

FIG. 7 depicts example user interfaces which can be presented on a mobile device for facilitating activation and reducing the likelihood that the user disrupts the activation process by, for example, putting the activation application in the background.

In one example, a wallet client displays an activation screen on a mobile device such as view 701 in FIG. 7, which informs the user that the application is updating and requests the user not to close or minimize the application, or screen 702, which instructs the user to wait while the background processes are completing or updating.

Thus, the wallet client includes a user interface for displaying, for example, a status of receiving the push messages from the wallet server.

III. Computer Readable Medium Implementation

The present invention (e.g., system 100, processes 200-600, or any part(s) or function(s) thereof) can be implemented using hardware, software, or a combination thereof, and can be implemented in one or more mobile device or other processing systems. To the extent that manipulations performed by the present invention were referred to in terms of human operation, no such capability of a human operator is necessary, or desirable in most cases, in any of the operations described herein which form part of the present invention. Rather, the operations described herein are machine operations. Useful machines for performing the operations of the present invention include mobile devices, smartphones, personal digital assistants (PDAs) or similar devices.

Figure 8:
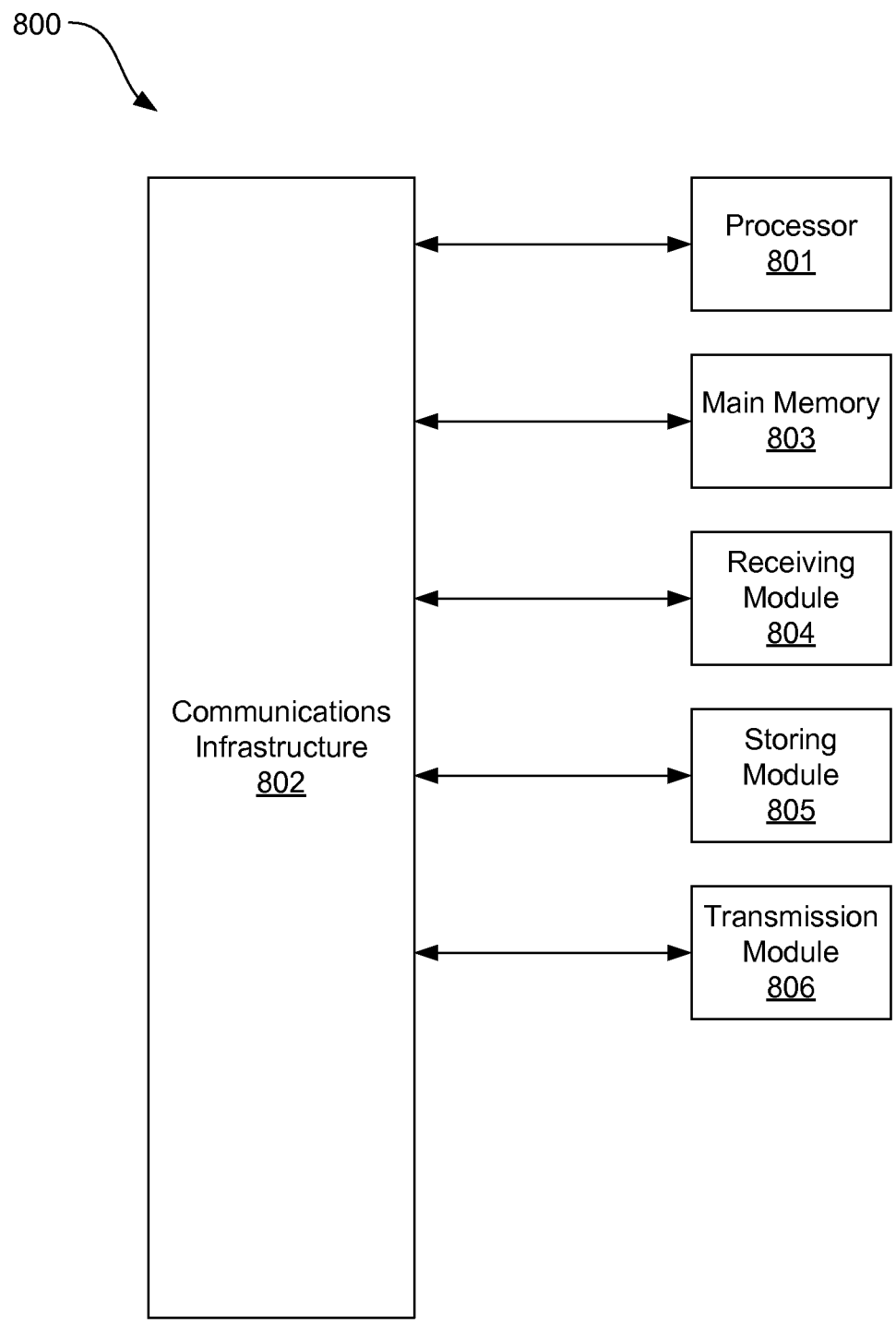
FIG. 8 is a block diagram of an exemplary system useful for implementing the present invention.

In one embodiment, the invention is directed toward one or more systems capable of carrying out the functionality described herein. An example of a system 800 is shown in FIG. 8.

The system 800 includes one or more processors, such as processor 801. The processor 801 is connected to a communication infrastructure 802 (e.g., communication bus, network). Various embodiments are described in terms of this exemplary system. After reading this description, it will become more apparent to a person skilled in the relevant art(s) how to implement the invention using other systems and/or architectures.

The system 800 also includes a main memory 803, which may be a non-volatile memory, or the like.

The system 800 also includes a receiving module 804 for receiving data such as requests. Receiving requests is discussed in further detail above with reference to FIGS. 1-6.

The system 800 also includes a storing module 805 for storing, for example, data on the main memory 803. Storing data is discussed in further detail above with reference to FIGS. 1-6.

The system 800 also includes a transmission module 806 for transmitting data, such as requests, for example over a communications network. Transmitting data is discussed in further detail above with reference to FIGS. 1-6.

Each of modules 804-806 may be implemented using hardware, software or a combination of the two.

The example embodiments described above such as the systems and procedures depicted in or discussed in connection with FIGS. 1-8, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A wallet server system to manage activation of a mobile wallet, comprising:
   at least one memory; and
   a processor coupled to the at least one memory, the processor being operable to:
   receive a wallet activation request from a wallet client, wherein the wallet client is an application executed in an operating system (OS) allowing multitasking via foreground and background states, wherein the wallet client, when executing in a foreground state, is able to receive push messages from a central trusted service manager (TSM) and wherein the wallet client, when executing in a background state, is unable to receive push messages from the TSM;
   transmit the wallet activation request to the central TSM;
   receive one or more push messages including activation data from the central TSM;
   receive, from the wallet client, a second request indicating that the wallet client is in a foreground state; and
   in response to receiving from the wallet client the second request indicating that the wallet client is in the foreground state, transmit the one or more push messages to the wallet client.

2. The system according to claim 1, wherein the foreground state of the application comprises an active state of the application and the background state of the application comprises an inactive state of the application or a state of the application less active than the foreground state of the application.

3. The system according to claim 1, wherein the one or more push messages are generated at the central TSM, and include one or more bundled payloads with each bundled payload having multiple data elements.

4. The system according to claim 3, wherein a first push message includes a first bundled payload comprising wallet activation messages, and wherein a second push message includes a second bundled payload comprising setup service account data and key rotation data.

5. The system according to claim 1, wherein the processor is further operable to establish a wallet activation session with the central TSM for receiving the push messages.

6. The system according to claim 1, wherein the processor is further operable to periodically delete push messages which have not been processed by the wallet client.

7. The system according to claim 1, wherein the wallet client includes a user interface for displaying a status of receiving the push messages from the wallet server.

8. The system according to claim 1, wherein the wallet client enables reception of push messages for a predetermined period of time.

9. A method for managing activation of a mobile wallet, the method comprising:
receiving a wallet activation request from a wallet client, wherein the wallet client is an application executed in an operating system (OS) allowing multitasking via foreground and background states, wherein the wallet client, when executing in a foreground state, is able to receive push messages and wherein the wallet client, when executing in a background state, is unable to receive push messages;
transmitting the wallet activation request to a central trusted service manager (TSM);
receiving one or more push messages including activation data from the TSM;
receive, from the wallet client, a second request indicating that the wallet client is in a foreground state; and
transmitting the push messages to the wallet client, in response to receiving from the wallet client the second request indicating that the wallet client is in a foreground state, while the wallet client is in the foreground state.

10. The method according to claim 9, wherein the foreground state of the application comprises an active state of the application and the background state of the application comprises an inactive state of the application or a state of the application less active than the foreground state of the application.

11. The method according to claim 9, wherein the one or more push messages are generated by the TSM, and include one or more bundled payloads with each bundled payload having multiple data elements.

12. The method according to claim 11, wherein a first push message includes a first bundled payload comprising wallet activation messages, and wherein a second push message includes a second bundled payload comprising setup service account data and key rotation data.

13. The method according to claim 9, wherein the TSM establishes a wallet activation session with the wallet server for transmitting the push messages to the wallet server.

14. The method according to claim 9, wherein the wallet server periodically deletes push messages which have not been processed by the wallet client.

15. The method according to claim 9, wherein the wallet client includes a user interface for displaying a status of receiving the push messages from the wallet server.

16. The method according to claim 9, wherein the wallet client enables reception of push messages for a predetermined period of time.

17. A non-transitory computer-readable medium having stored thereon sequences of instructions for causing one or more processors to:
receive a wallet activation request from a wallet client, wherein the wallet client is an application executed in an operating system (OS) allowing multitasking via foreground and background states, wherein the wallet client, when executing in a foreground state, is able to receive push messages and wherein the wallet client, when executing in a background state, is unable to receive push messages;
transmit the wallet activation request to a central trusted service manager (TSM);
receive one or more push messages including activation data from the TSM;
receive, from the wallet client, a second request indicating that the wallet client is in a foreground state; and
transmit the push messages to the wallet client, in response to receiving the second request from the wallet client indicating that the wallet client is in the foreground state, while the wallet client is in the foreground state.

18. A wallet client system for managing activation of a mobile wallet, the system comprising:
at least one memory; and
a processor coupled to the at least one memory, the processor being operable to execute a wallet client in an operating system (OS) allowing multitasking via foreground and background states, wherein the processor, when executing the wallet client in a foreground state, is able to receive push messages from a trusted service manager (TSM) and wherein the processor, when executing the wallet client in the background state, is unable to receive push messages from the TSM, the processor being operable to:
transmit a wallet activation request to a wallet server, wherein the wallet server transmits the activation request to a central trusted service manager (TSM), and wherein the wallet server receives one or more push messages including activation data from the TSM; and
transmitting a second request to the wallet server while the wallet client system is being executed by the processor in the foreground state; and
receiving the one or more push messages while the wallet client system is being executed in the foreground state.

* * * * *